US012802156B2

(12) United States Patent
Du et al.

(10) Patent No.: US 12,802,156 B2
(45) Date of Patent: Nov. 17, 2026

(54) VIDEO COVER GENERATION METHOD, APPARATUS, ELECTRONIC DEVICE AND READABLE MEDIUM

(71) Applicant: BEIJING BYTEDANCE NETWORK TECHNOLOGY CO., LTD., Beijing (CN)

(72) Inventors: Zongcai Du, Beijing (CN); Haowei Lu, Beijing (CN); Zhiqiang Lang, Beijing (CN); Xiaoxia Hou, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 283 days.

(21) Appl. No.: 18/693,737

(22) PCT Filed: Sep. 16, 2022

(86) PCT No.: PCT/CN2022/119224
§ 371 (c)(1),
(2) Date: Mar. 20, 2024

(87) PCT Pub. No.: WO2023/056835
PCT Pub. Date: Apr. 13, 2023

(65) Prior Publication Data

US 2024/0386639 A1 Nov. 21, 2024

(30) Foreign Application Priority Data

Oct. 9, 2021 (CN) .......................... 202111176742.6

(51) Int. Cl.
*G06T 3/02* (2024.01)
*G06T 5/70* (2024.01)
(Continued)

(52) U.S. Cl.
CPC .................. *G06T 3/02* (2024.01); *G06T 5/70* (2024.01); *G06T 7/0002* (2013.01); *G06T 7/90* (2017.01);
(Continued)

(58) Field of Classification Search
CPC ... G06T 11/60; G06T 3/02; G06T 5/70; G06T 7/0002; G06T 7/90; G06T 11/10;
(Continued)

(56) References Cited

U.S. PATENT DOCUMENTS 6,052,492 A * 4/2000 Bruckhaus ............ G11B 27/28
382/284
7,149,974 B2 * 12/2006 Girgensohn .......... G11B 27/34
715/788
(Continued)

FOREIGN PATENT DOCUMENTS

CN 108600865 A 9/2018
CN 109905782 A 6/2019
(Continued)

OTHER PUBLICATIONS

China Patent Application No. 202111176742.6; Office Action; dated Jul. 8, 2024; 13 pages.
(Continued)

*Primary Examiner* — Kenny Nguyen
(74) *Attorney, Agent, or Firm* — BakerHostetler

(57) ABSTRACT

Disclosed are a video cover generation method, apparatus, electronic device, and readable medium. The at least one method comprises: extracting at least two key frames in the video, wherein the key frame comprises feature information displayed in a cover; according to an action relevance of the at least two key frames, fusing the feature information in the
(Continued)

at least two key frames in a single image to generate a cover of the video, wherein the action relevance comprises being relevant or being irrelevant.

20 Claims, 6 Drawing Sheets

(51) Int. Cl.

| | |
|---|---|
| ***G06T 7/00*** | (2017.01) |
| ***G06T 7/90*** | (2017.01) |
| ***G06T 11/10*** | (2026.01) |
| ***G06T 11/60*** | (2026.01) |
| ***G06V 10/762*** | (2022.01) |
| ***G06V 20/40*** | (2022.01) |

(52) U.S. Cl.
CPC .............. *G06T 11/10* (2026.01); *G06T 11/60* (2013.01); *G06V 10/762* (2022.01); *G06V 20/46* (2022.01); *G06T 2207/10016* (2013.01); *G06T 2207/10024* (2013.01); *G06T 2207/20221* (2013.01); *G06T 2207/30168* (2013.01)

(58) Field of Classification Search
CPC . G06T 2207/10016; G06T 2207/10024; G06T 2207/20221; G06T 2207/30168; G06T 11/00; G06V 10/762; G06V 20/46; G06V 20/41; G06V 20/49; H04N 21/234; H04N 21/44; H04N 21/8549
See application file for complete search history.

(56) References Cited

U.S. PATENT DOCUMENTS

| | | | | |
|---|---|---|---|---|
| 8,466,961 | B2 * | 6/2013 | Sekine | H04N 21/84 348/150 |
| 8,503,523 | B2 * | 8/2013 | Williams | H04N 21/23418 375/240.09 |
| 8,571,330 | B2 * | 10/2013 | Gao | G06F 16/70 382/176 |
| 9,286,938 | B1 * | 3/2016 | Tseytlin | G11B 27/031 |
| 10,701,434 | B1 * | 6/2020 | Jindal | G06N 20/10 |
| 10,817,998 | B1 * | 10/2020 | Lebrun | G06T 7/0002 |
| 2005/0074168 | A1 | 4/2005 | Cooper et al. | |
| 2006/0026524 | A1 | 2/2006 | Ma et al. | |
| 2006/0064716 | A1 * | 3/2006 | Sull | G06F 16/784 715/201 |
| 2009/0083814 | A1 * | 3/2009 | Sekine | H04N 21/84 725/104 |
| 2010/0042642 | A1 * | 2/2010 | Shahraray | G06F 16/783 707/756 |
| 2011/0081075 | A1 | 4/2011 | Adcock et al. | |
| 2014/0099034 | A1 * | 4/2014 | Rafati | G06V 20/47 382/209 |
| 2015/0358612 | A1 * | 12/2015 | Sandrew | H04N 13/261 348/47 |
| 2016/0037170 | A1 * | 2/2016 | Zhang | H04N 19/147 375/240.12 |
| 2016/0314819 | A1 * | 10/2016 | Elsner | H04N 19/46 |
| 2018/0061459 | A1 * | 3/2018 | Song | G06V 10/993 |
| 2018/0197577 | A1 * | 7/2018 | Farre Guiu | G11B 27/3081 |
| 2019/0022492 | A1 * | 1/2019 | Takahashi | G06T 19/00 |
| 2019/0261041 | A1 * | 8/2019 | Swenson | G11B 27/031 |
| 2021/0035281 | A1 * | 2/2021 | Lebrun | G06T 7/0002 |

FOREIGN PATENT DOCUMENTS

| | | | |
|---|---|---|---|
| CN | 109996091 | A | 7/2019 |
| CN | 110446063 | A | 11/2019 |
| CN | 110602554 | A | 12/2019 |
| CN | 111491173 | A | 8/2020 |
| CN | 111563442 | A | 8/2020 |
| CN | 112954450 | A | 6/2021 |
| CN | 113269067 | A | 8/2021 |
| EP | 1045316 | A2 | 10/2000 |

OTHER PUBLICATIONS

International Patent Application No. PCT/CN2022/119224; Int'l Search Report; dated Nov. 30, 2022; 2 pages.
Chinese Patent Application No. 202111176742.6; Notice of Grant dated Feb. 28, 2025; 6 pages with machine translation.

* cited by examiner

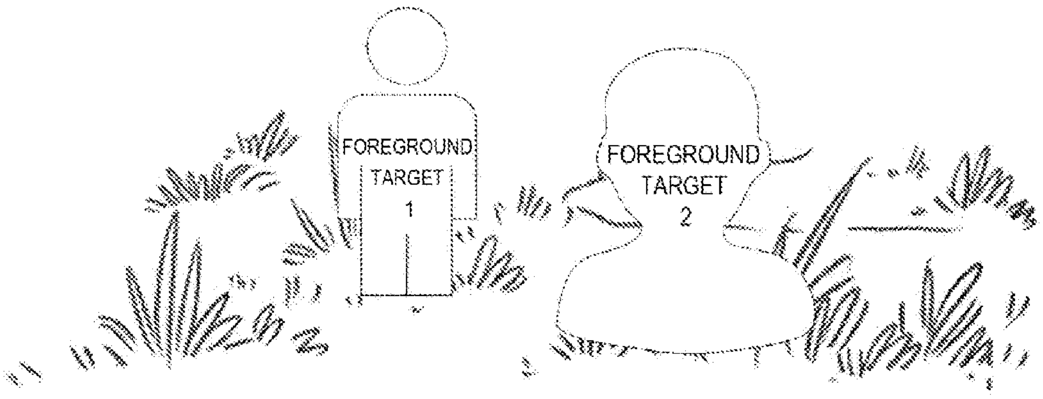
FIG. 6
CLUSTER THE IMAGES IN THE VIDEO TO OBTAIN AT LEAST TWO CATEGORIES — S410
↓
BASED ON AN IMAGE QUALITY EVALUATION ALGORITHM, EXTRACT CORRESPONDING KEYFRAMES FROM EACH CATEGORY — S420
↓
EXTRACT AN IMAGE BLOCK CONTAINING FEATURE INFORMATION IN EACH KEY FRAME — S430
↓
STITCH ALL IMAGE BLOCKS TO OBTAIN A SINGLE IMAGE, AND USE THE SINGLE IMAGE AS THE COVER OF THE VIDEO — S440
FIG. 7
FIG. 8

VIDEO COVER GENERATION METHOD, APPARATUS, ELECTRONIC DEVICE AND READABLE MEDIUM

This application is the U.S. National Stage of International Application No. PCT/CN2022/119224, filed on Sep. 16, 2022, which claims priority to Chinese Patent Application No. 202111176742.6 filed on Oct. 9, 2021, which are incorporated herein by reference in their entireties.

FIELD

The present disclosure relates to the field of image processing technology, such as a video cover generation method, apparatus, electronic device, and readable medium.

BACKGROUND

A video cover is a form of displaying the key content of a video, and it is also a collection of information that a user receives a at a first glance when viewing the video display page. It plays an important role in attracting users to watch videos. Usually, a frame image from the video can be used as the video cover, but this form is relatively simple, and the amount of information that the video cover can reflect is very small, which is not conducive to help users quickly understanding the key content of the video.

In order to display more video content, the video cover can also be a beautiful image designed by human. This situation has relatively diverse forms and can reflect more information. However, the design process requires the use of certain professional tools (such as PhotoShop, etc.), which cannot automatically generate the video cover. The whole process is time-consuming and laborious. In some scenarios, a dynamic cover is generated using multiple frames of images in the video. Generally, the most exciting segment in the video is used, which has better expression ability than the static cover. However, the corresponding algorithm complexity is higher. The dynamic cover training model generally requires a large amount of annotated data, and the annotation difficulty is high. This process is also very time-consuming and labor-intensive, and the dynamic cover occupies more storage space than the static cover. In summary, the video cover generation method is time-consuming, labor-intensive, costly, and an efficiency in generating video covers is relatively low.

SUMMARY

The present disclosure provides a video cover generating method, apparatus, electronic device and readable medium to display rich video content in the cover, to improve the efficiency of generating a video cover.

The present disclosure provides a method for generating a video cover, comprising:

Extracting at least two key frames in the video, wherein the key frame comprises feature information to be displayed in a cover;

According to an action relevance of the at least two key frames, fusing the feature information in the at least two key frames in a single image to generate a cover of the video, wherein the action relevance comprises being relevant or being irrelevant.

The present disclosure also provides a video cover generation apparatus, comprising:

An extraction module, configured to extract at least two key frames in the video, wherein the key frame comprises feature information of the video;

A generation module, configured to according to an action relevance of the at least two key frames, fuse the feature information in the at least two key frames in a single image to generate a cover of the video, wherein the action relevance comprises being relevant or being irrelevant.

The present disclosure also provides an electronic device comprising:

One or more processors;

A storage device configured to store one or more programs;

When the one or more programs are executed by the one or more processors, the one or more processors implement the above video cover generation method.

The present disclosure also provides a computer-readable medium on which a computer program is stored, which implements the above-mentioned video cover generation method when executed by a processor.

BRIEF DESCRIPTION OF THE DRAWINGS

FIG. 6 is a schematic diagram of fusing the foreground target of a plurality of key frames in the main frame provided in the third embodiment of the present disclosure;

FIG. 7 is a flowchart of a video cover generating method according to the fourth embodiment of the present disclosure;

FIG. 8 is a schematic diagram of stitching a plurality of key frames of the image block provided in the fourth embodiment of the present disclosure;

DETAILED DESCRIPTION

Figure 1:
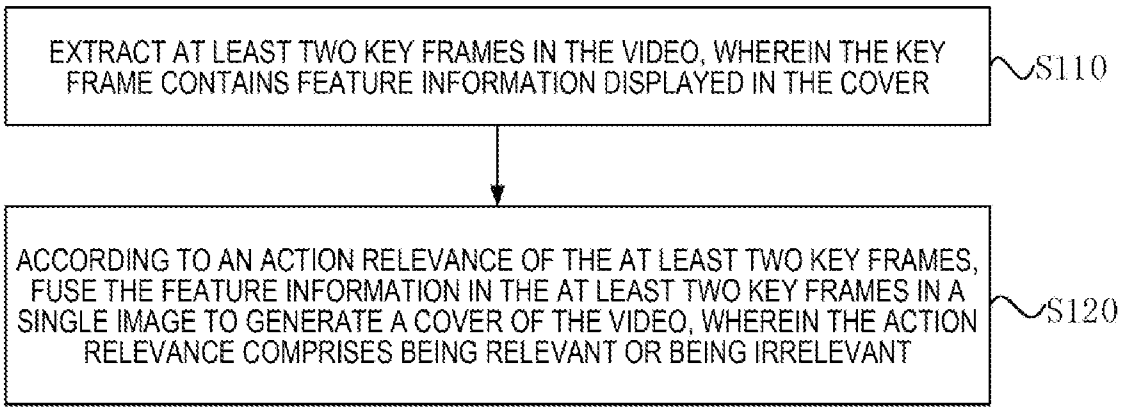
FIG. 1 is a flowchart of a video cover generation method according to an embodiment of the present disclosure.

The following embodiments of the present disclosure will be described with reference to the accompanying drawings.

Although some embodiments of the present disclosure are shown in the drawings, the present disclosure can be implemented in various forms, and these embodiments are provided to understand the present disclosure. The drawings and embodiments of the present disclosure are for illustrative purposes only.

The multiple steps described in the method implementation method of this disclosure can be executed in different orders and/or in parallel. In addition, the method implementation method can include additional steps and/or omit the steps shown. The scope of this disclosure is not limited in this regard.

The term "including" and its variations used in this article are open-ended, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

The concepts of "first" and "second" mentioned in this disclosure are only used to distinguish different devices, modules, or units, and are not used to limit the order or interdependence of the functions performed by these devices, modules, or units.

The names of the messages or information exchanged between multiple devices in this public implementation are for illustrative purposes only and are not intended to limit the scope of these messages or information.

The following embodiments, each embodiment while providing optional features and examples, a plurality of features described in the embodiment may be combined to form a plurality of schemes, each numbered embodiment should not be regarded as only one technical solution.

First Embodiment

FIG. 1 is a flowchart of a video cover generation method according to a disclosed embodiment of the present invention. The method is applicable to the case of automatically generating a cover for a video, for example, by fusing feature information of multiple frames of video in a single image as a cover, thereby displaying rich video content in the cover. The method may be performed by a video cover generation device, the device may be implemented by software and/or hardware, and integrated on an electronic device. The electronic device in the present embodiment may be a computer, a laptop, a server, a tablet computer or a smart phone device having an image processing function.

As shown in FIG. 1, the present embodiment discloses a video cover generation method, comprising:

S110, extracting at least two key frames in the video, wherein the key frame contains feature information to be displayed in the cover.

In this embodiment, the video comprises multiple frames of images, and the video can be captured or uploaded by the user, or downloaded from the network. Key frames mainly refer to frames that can reflect the key content or scene changes in the multi-frame images, such as frames containing the main characters in the video, frames belonging to exciting or classic clips, frames with obvious changes in the scene, and frames containing key actions of the characters, all of which can be used as key frames. Key frames can be selected through image similarity clustering and image quality evaluation of multi-frame images in the video, and key frames can also be obtained by recognizing actions or behaviors in the video.

Feature information may be used to describe the video content reflected by the key frame features, such as a hue of the key frame, expression or action features of a character in the key frame, real-time subtitles matching the key frame, etc. By displaying the feature information in the key frame in the cover, it can attract viewers and help viewers quickly understand the video content.

In the present embodiment, the number of key frames extracted from the video is at least two, on this basis, different key frames can be used to provide a variety of feature information for generating the cover, so that the content displayed in the cover is richer.

S120. According to the action relevance of at least two key frames, fusing the feature information in the at least two key frames into a single image to generate a cover of the video, wherein the action relevance includes being relevant or being irrelevant.

In this embodiment, the action relevance of multiple key frames can be an attribute that describes whether instances in different key frames have completed effective actions or behaviors. If it can be recognized from the video that instances in multiple frames have completed effective actions or behaviors, then these frames can be used as key frames, and the action relevance between these key frames is be relevant; if effective actions or behaviors cannot be recognized, the action relevance is being irrelevant. Among them, effective actions or behaviors can refer to actions or behaviors that a machine learning model can automatically recognize based on the preset behavior library, such as running, jumping, walking, waving, or bending over. The preset behavior library stores the feature sequences of relevant actions or behaviors in multiple frames, so it can be learned and recognized by the machine learning model.

Action relevance is not only related to whether effective actions or behaviors can be recognized, but also to a degree of background differences between these frames. The degree of background differences can include a difference of the scene contents and a difference of the hue in these frames. For example, in multiple key frames, although the characters are all running, the scenes in the first few frames are parks and the scenes in the next few frames are indoor, indicating that the running actions in the video did not occur in the same time period. Therefore, the background differences of these key frames are large, and the action relevance is being irrelevant. For example, if the scenes of two key frames are also parks, but one key frame is a daytime image and the other is a nighttime image, and there is a significant difference in hue, the action relevance is also being irrelevant.

In this embodiment, the action relevance affects the fusion mode of feature information of multiple key frames. For example, if the action relevance of multiple key frames is being relevant, character instances can be extracted from each key frame, and these character instances can be added to the same background. The background can be the background of any key frame or the background generated based on at least two key frames. In this case, a single static image can be used as the cover to show an action or behavior completed by the character instance in the video. Compared with the way of displaying actions or behaviors using dynamic images, it effectively reduces computing resources and storage space occupation. If the action relevance of multiple key frames is being irrelevant, multiple key frames can be cropped, scaled, spliced, etc., and all or part of the feature information in multiple key frames can be fused in a single image.

For example, for each key frame, the character instances can be extracted and added to the same background, which can be the background of any key frame or the background generated based on at least two key frames; if the action relevance of multiple key frames is being relevant, multiple character instances can be arranged in chronological order (such as from left to right, or from right to left, etc.), and the arrangement position of each character instance in the background is consistent with its relative position in the original key frame, making it easier to understand the pose of the character instance visually; if the action relevance of multiple key frames is being irrelevant, the instances in each key frame can be arranged freely without the need to arrange in chronological order or maintain the consistency between the arrangement position and the relative position.

For example, for each key frame, the character instances can be extracted and added to the same background. If the action relevance of multiple key frames is being relevant, the background can be generated based on the background of multiple key frames, thereby maintaining the consistency of the style between the background and the background of multiple key frames during the action process, which can maximize the restoration of the background of the action process and make it easier for viewers to understand the actions that occur in the background. If the action relevance of multiple key frames is being irrelevant, there is no need to consider the consistency of the background style with the background during the action process. Any key frame or image outside of any video (such as a solid color image, an image uploaded or selected by the viewer, or a template image) can be used as the background, and the character instances in other key frames can be arranged here.

The action sequence recognition algorithm can be used to determine the action relevance of multiple key frames. For example, the human posture recognition (Open-pose) algorithm is used to estimate the pose of a character in a video. Firstly, the position coordinates of the human joint points in each frame of the video are extracted, and the distance change matrix of the human joint points between adjacent two frames of images is calculated based on this. Then, the video is segmented and the video features are generated using the distance change matrix corresponding to each video segment. Finally, the trained classifier is used to classify the video features. If it can be recognized that the video features corresponding to a video belong to the action or behavior feature sequence in the preset behavior library, then the frame corresponding to this video is the key frame, and the action relevance of multiple key frames is being relevant. For example, the instance segmentation algorithm is used to extract the contours of the characters in each key frame and perform posture expression, and the clustering algorithm is used to extract the key features of the posture. Based on these key features, the dynamic time warping (DTW) algorithm is used to complete action recognition, etc.

According to the video cover generation method in the present embodiment, by fusing the feature information of a plurality of key frames in a single image, a single static image can show rich video content, less computing resources and storage space will be occupied, and the generation of a cover can be more efficient. Further, it can attract viewers and help viewers quickly understand the video content; in addition, when the feature information of different key frames are fused, considering the action relevance of a plurality of key frames, action relevance affects the fusion mode of feature information of a plurality of key frames, and the generated video cover can be more flexible and diverse.

Second Embodiment

Figure 2:
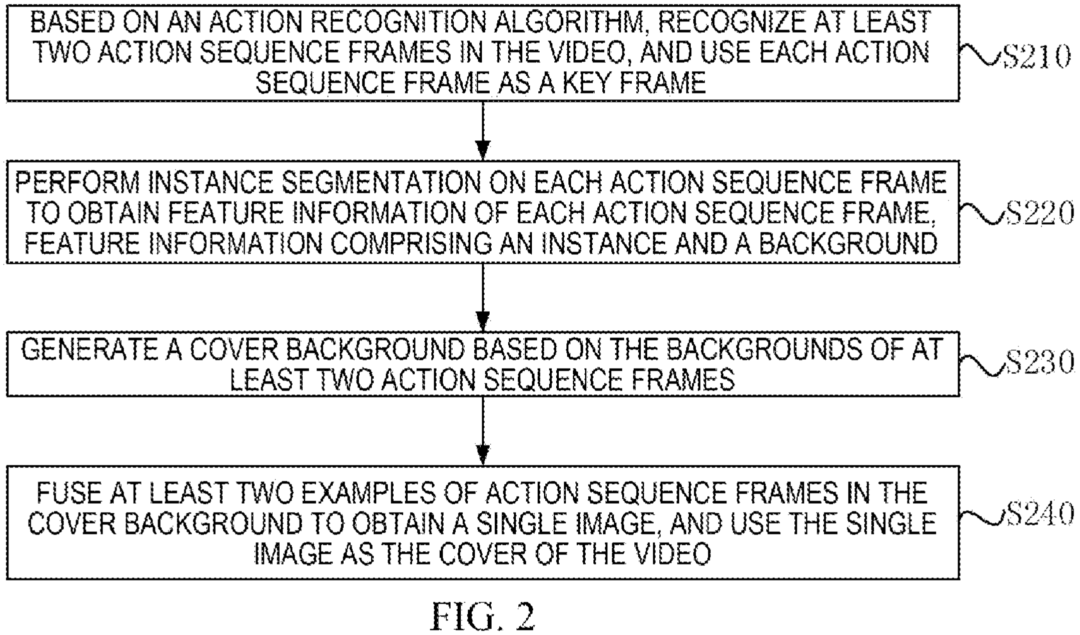
FIG. 2 is a flowchart of a video cover generation method according to the second embodiment of the present disclosure.

FIG. 2 is a flowchart of a method of generating a video cover of the present disclosure provides two embodiments. Based on the above embodiment, the process of generating a video cover in the case where the action relevance will be described.

In the present embodiment, extracting at least two key frames in the video comprises: recognizing an action sequence frame based an action recognition algorithm and using the action sequence frame as a key frame; wherein the action relevance is being relevant. On this basis, the action sequence frames with correlation can be fused to display video content about a complete action or behavior in a static cover.

As shown in FIG. 2, the second embodiment of the present disclosure video cover generation method, comprising:

S210, based on the action recognition algorithm, recognizing at least two action sequence frames in the video, and use each action sequence frame as a key frame.

In this embodiment, using the action recognition algorithm, multiple valid action sequence frames can be recognized from the video, and the character instances in each action sequence frame can express a complete action or behavior in chronological order. Among them, the action recognition algorithm can be implemented through the Temporal Segment Network (TSM) model, which is trained based on the Kinetics-400 dataset and can be used to recognize 400 actions, which can meet the needs of recognizing and displaying the actions of instances on the cover.

When multiple valid action sequence frames are recognized, the degree of background difference between multiple action sequence frames can be determined. If the degree of background difference is within an allowable range, the action relevance is determined as being relevant, and multiple action sequence frames can be segmented and fused to obtain a cover that can express actions or behaviors.

S220, performing instance segmentation on each action sequence frame to obtain feature information of each action sequence frame, which includes an instance and a background.

The main purpose of instance segmentation is to separate the instances in each action sequence frame from the background. Multiple instances can be fused into the same background to represent a complete action or behavior. Multiple backgrounds can be used to generate cover backgrounds. For example, the Separate Object instances by Location and sizes (SOLO) algorithm is used to segment each action sequence frame. The SOLOv2 algorithm can be used to segment instances by position and size, which has a high accuracy and real-time performance, and can improve the efficiency of generating video covers.

S230, generating a cover background based on the background of at least two action sequence frames.

In this embodiment, the cover background mainly refers to the background used for arranging multiple action sequence frames, which can be generated based on the background of multiple action sequence frames. For example, it may take the mean of the pixel values of the background of multiple action sequence frames at each position to obtain the cover background, and this way is relatively simple and suitable for situations with a large number of action sequence frames. Another example is selecting the highest image quality from the background of multiple action sequence frames, or the background corresponding to the first action sequence frame, the last action sequence frame, or the action sequence frame located in the middle as the cover background. This method is also easy to implement, but the fusion of the backgrounds of multiple action sequence frames is relatively low. Another example is that for the background of each action sequence frame, the part of the example that is cut out is a blank area. The background of other action sequence frames can be used to fill the blank area of the example that is cut out in the background, and then from the multiple action sequence frames that have been filled, one frame is selected as the cover background. Or take the mean of multiple action sequence frames that have been filled as the cover background. This method can take into account the quality and integration of different backgrounds. On this basis, by integrating the characteristics of multiple action sequence frames, the style consistency of the cover and the background of multiple key frames in the process of action is ensured, which is convenient for viewers to accurately understand the video content.

S240, fusing at least two instances of action sequence frames in the cover background to obtain a single image, and using the single image as the cover of the video.

In this embodiment, a plurality of instances of the action sequence frame are added to the cover background, so that a single static image can be used to show the complete action of the integrated multi-frame. In this process, according to the relative position of each instance of the action sequence frame in the original action sequence frame, each instance can be added to the corresponding position in the cover background to ensure that the relative position of each instance is consistent with the position in the action process, and has better visualization effect.

Figure 3:
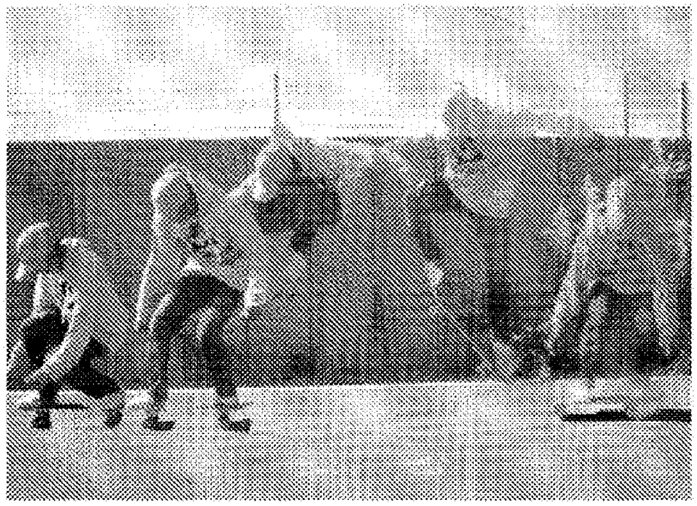
FIG. 3 is a schematic diagram of fusing an instance of the action sequence frame in a single image provided in the second embodiment of the present disclosure.

FIG. 3 is a schematic diagram of an example of fusing an action sequence frame in a single image provided in the second embodiment of the present disclosure. The single image shown in FIG. 3 is the cover of the video, and the five character instances can be obtained from five action sequence frames, which express the action of a skateboard jump. In order to make the cover generated according to the action sequence frame clearer and more reasonable layout, after obtaining a unified background, the instances in each action sequence frame can be arranged in an appropriate position in the background. Typically, if the five key frames are used to express the actions of the character instances, it needs to make these key frames into dynamic images, which require a large amount of calculation and take up a large space. However, the method of this embodiment can effectively fuse the feature information of multiple action sequence frames using a static single image and display rich video content with limited resources.

Before generating a cover background based on at least two action sequence frames, it further includes: selecting an action sequence frame as a reference frame, and determining an affine transformation matrix between each action sequence frame and the reference frame according to a feature point matching algorithm; aligning the background of each action sequence frame with the background of the reference frame according to the affine transformation matrix.

Due to different angles, jitter, or errors in video shooting, the backgrounds of different action sequence frames are not aligned. Directly using the backgrounds of multiple action sequence frames to generate cover backgrounds may cause local distortion, deformation, or blur, which affects the accuracy and visual effect of the background. Therefore, before generating cover backgrounds based on the backgrounds of multiple action sequence frames, an action sequence frame can be selected as a reference frame, and the background of each other action sequence frame can be aligned with the background of the reference frame. The reference frame can be the action sequence frame with the highest image quality, the first action sequence frame, the last action sequence frame, or the action sequence frame located in the middle.

In this embodiment, the affine transformation matrix between each action sequence frame and the reference frame is determined according to the feature point matching algorithm, wherein the affine transformation matrix is used to describe the transformation relationship between the matched feature points from the action sequence frame to the reference frame, and the affine transformation includes linear transformation and translation transformation. The feature point matching algorithm can be a Scale-invariant Feature Transform (SIFT) algorithm, which first extracts the key feature points in the background of each action sequence frame. These key feature points will not disappear due to factors such as illumination, scale, and rotation. Then, according to the feature vector of each key point, the key points in the action sequence frame and the reference frame are compared in pairs to find multiple pairs of feature points that match each other between the action sequence frame and the reference frame, thereby establishing the correspondence between feature points and obtaining an affine transformation matrix.

Generating a cover background based on the background of at least two action sequence frames, comprising: removing a corresponding instance from the action sequence frame for each action sequence frame, filling the area corresponding to the removed instance in the action sequence frame according to the feature information of the corresponding area of the set action sequence frame, and obtaining a filling result corresponding to the action sequence frame, wherein the set action sequence frame includes at least two action sequence frames that are different from the current action sequence frame; generating a cover background based on the filling result of at least two action sequence frames.

In this embodiment, the process of generating the cover background can be divided into two stages. In the first stage, for each action sequence frame is removed instance area, the background can be used to fill the other action sequence frame region, to obtain the action sequence frame corresponding to the filling result, the filling result can be a rough background cover; in the second stage, a cover background is generated based on the filling result of a plurality of action sequence frames, and this stage can be a rough background cover repair process, the cover background obtained is more fine, for example, a plurality of action sequence frames corresponding to the rough background cover averaging, to obtain the cover background.

Figure 4:
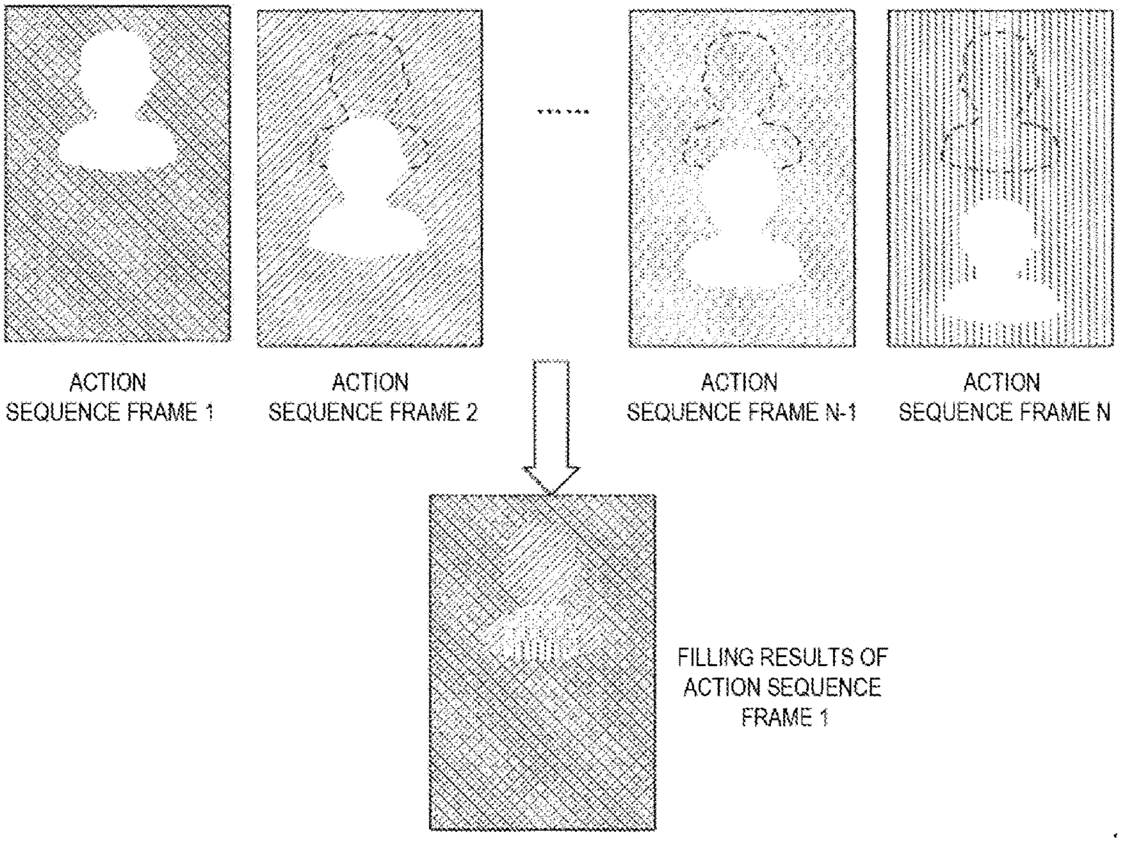
FIG. 4 is a schematic diagram of filling a sequence frame region from which an instance is removed provided in the second embodiment of the present disclosure.

FIG. 4 is a schematic diagram of a filling action sequence frame provided in the second embodiment of the present disclosure. As shown in FIG. 4, assuming a total of N (N is an integer greater than 2) action sequence frames, the blank character-shaped area in each action sequence frame represents the area after removing the character instance, and the position or action of the character instance in different action sequence frames may be different. The feature information of the background after removing the character instance in action sequence frame 1 is represented by a grid; the feature information of the background after removing the character instance in action sequence frame 2 is represented by a slash; the feature information of the background after removing the character instance in action sequence frame N−1 is represented by a dot texture; and the feature information of the background after removing the character instance in action sequence frame N is represented by a vertical line.

Taking filling the blank area after removing the character instance in action sequence frame 1 as an example, in action sequence frame 2, the character shape shown by the dotted line is the corresponding area, and the feature information represented by the oblique line in this area can be used to fill the blank area after removing the character instance in action sequence frame 1. However, the character shape shown by the dotted line in action sequence frame 2 also contains a part of the blank space (caused by the removal of the character instance in action sequence frame 2). Therefore, only using the feature information in the corresponding area in action sequence frame 2 cannot completely fill the area after removing the character instance in action sequence frame 1, so the feature information of the corresponding area in the next action sequence frame can continue to be used to fill the blank area after removing the character instance in action sequence frame 1. Assuming that the next action sequence frame is action sequence frame N−1, the feature information represented by the dot texture in the character shape shown by the dotted line in action sequence frame N−1 can be used to continue filling the blank area after removing the character instance in action sequence frame 1. However, it still cannot be completely filled, so it is necessary to use the feature information represented by the dot texture in the character shape shown by the dotted line in action sequence frame N to continue filling the blank area after removing the character instance in action sequence frame 1 to obtain the filling result of action sequence frame 1. In the filling result, the feature information of the oblique part comes from the corresponding area of the action sequence frame 2, the feature information of the dotted part comes from the corresponding area of the action sequence frame N−1, and the feature information of the vertical part comes from the corresponding area of the action sequence frame N.

One situation is that if the feature information of the corresponding area of the action sequence frame i ($2 \le i < N$) cannot completely fill the area after removing the character instance in the action sequence frame 1, the feature information of the action sequence frame i+1 in the corresponding area can continue to be filled until the feature information of the corresponding area of the last action sequence frame is filled. Regardless of whether it can be completely filled, the filling operation of the action sequence frame 1 can be ended to obtain the filling result of the action sequence frame 1.

Another situation is that if the feature information of the corresponding area of the action sequence frame i ($2 \le i < N$) can be completely filled, the filling operation of the action sequence frame 1 can be ended, and the filling result of the action sequence frame 1 can be obtained without using subsequent action sequence frames for filling.

Based on similar principles, the filling results of action sequence frames 2 to N can be obtained. Then, in the second stage, the cover background can be generated based on the filling results of action sequence frames. For example, the filling results of multiple action sequence frames are averaged, or the present embodiment also provides a method for repairing the filling results (rough background cover) of multiple action sequence frames to process the edges of the instance and obtain a cover background with higher accuracy.

In the second stage, the filling results of multiple action sequence frames are repaired, comprising:

Expansion processing is performed on the area of the removed instance in each action sequence frame to expand the area of the removed instance, and the expanded area covers the edge portion of the removed instance; for the expanded area in the action sequence frame, r the characteristics of the corresponding area in the filling results of each other action sequence frame are used to repair, where repair can refer to using a filling operation similar to the first stage, that is, using the characteristics of the corresponding area in the filling results of other action sequence frames to fill the expanded area again; repair can also use the average value of the characteristics of the corresponding area in the filling results of multiple action sequence frames to fill the expanded area again, so as to obtain the repair result of the action sequence frame, and finally average the repair results corresponding to multiple action sequence frames to obtain the cover background, so as to fully utilize the feature information of each other action sequence frame for fusion of the edges of the instance.

In addition, the repair operation in the second stage can be iteratively executed multiple times until the feature difference between the repair result obtained by any action sequence frame in the current iteration and the repair result in the previous iteration is within the allowable range, and the repair result at this time has fully integrated the feature information in the background of multiple action sequence frames, and the edge transition is smooth and the accuracy is higher.

The process of iteratively performing repair operations in the second stage comprises:

In the first iteration, for the swollen area of the removed instances in the filling result Rj ($1 \le j \le N$) of the action sequence frame j obtained in the first stage, the feature information of the corresponding areas in R1, R2 . . . RN is averaged and filled in the swollen area to repair the swollen area of the removed instances in Rj, and the repair result Rj1 of the action sequence frame j is obtained; then enter the second iteration. Similarly, for the swollen area of the removed instances in the repair result Rj1 of the action sequence frame j, the feature information of the corresponding areas in R1, R2 . . . RN is averaged and filled in the swollen area to repair the swollen area of the removed instances in Rj1, and the repair result Rj2 of the action sequence frame j is obtained; and so on, until the specified number of iterations, or until the difference between the repair result of any action sequence frame in any iteration process and the repair result of the last iteration is within the allowable range, the iteration is stopped, and the repair results of all action sequence frames are averaged to obtain the background cover.

The filling result obtained in the first stage is actually a rough background cover. The secondary filling operation in the second stage can improve the accuracy of filling. Incorrect pixel values in the expansion area will be gradually repaired by correct pixel values, while the correct pixel values in the background part outside the instance will not change with iteration, ensuring that the generated cover background fully integrates the feature information of multiple action sequence frames, and the edge processing effect is better, and the transition between the instance and the background is more natural.

The fusion degree of at least two action sequence frames with the cover background decreases in chronological order.

As shown in FIG. 3, the five character instances in the cover complete a skateboard jump from takeoff, takeoff to landing from right to left. The leftmost character instance corresponds to the last action sequence frame, while the leftmost character instance has lower integration and transparency with the cover background. Based on this, while displaying multiple action sequence frames through a static video cover, it can also reflect the timing sequence of multiple instances, with a visual persistence effect, making the displayed actions or behaviors more specific and vivid.

The video cover generation method in this embodiment adds multiple instances of action sequence frames to the cover background by identifying action sequence frames in the video, so as to display video content about a complete action or behavior in the static cover, making the cover generated according to the action sequence frames clearer and more reasonable; by generating cover backgrounds according to the backgrounds of multiple action sequence frames, the characteristics of multiple action sequence frames can be integrated to ensure the style consistency of the cover and the background of multiple key frames in the action occurrence process, which is convenient for viewers to accurately understand the video content; by selecting an action sequence frame as a reference frame, and aligning the background of each other action sequence frame with the background of the reference frame, the accuracy and visual effect of generating the background are improved; by obtaining the rough background cover of each action sequence frame in the first stage, repairing it in the second stage to improve the accuracy of filling, ensuring that the generated cover background fully integrates the feature information of multiple action sequence frames, and the edge processing effect is better, and the transition between the instance and the background is more natural; by setting different fusion degrees with the cover background for multiple action sequence frames, multiple instances of action sequence frames can be displayed through static video The temporal relationship makes the displayed actions or behaviors more specific and vivid.

Third Embodiment

Figure 5:
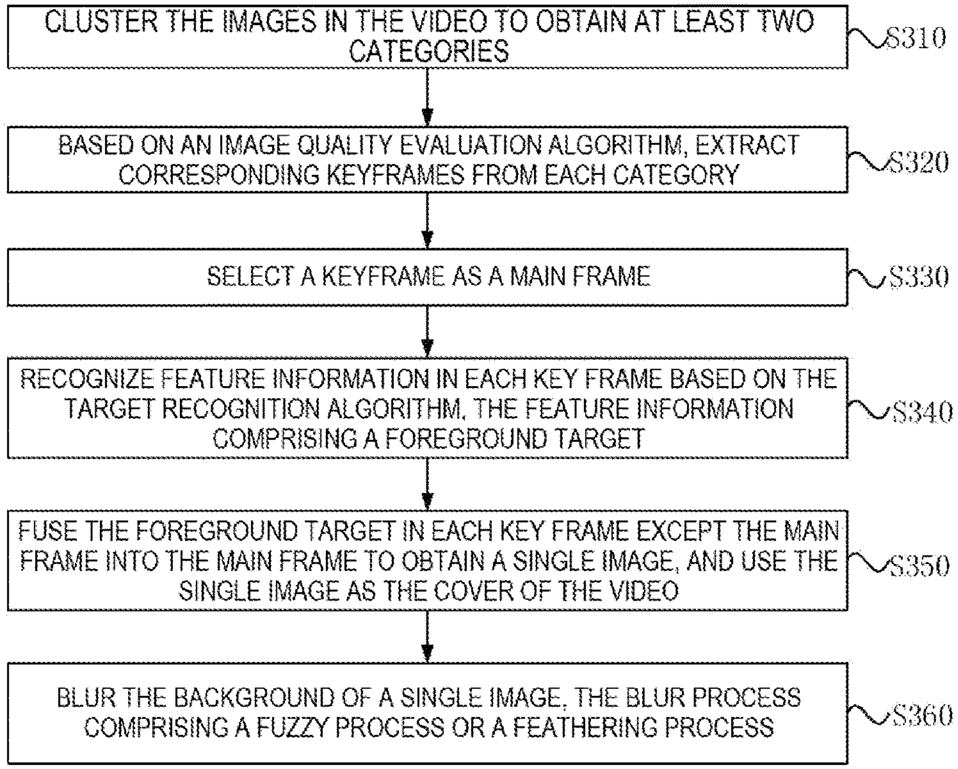
FIG. 5 is a flowchart of a video cover generation method according to the third embodiment of the present disclosure.

FIG. 5 is a flowchart of a video cover generation method according to the third embodiment of the present disclosure. Based on the above embodiment, the process of generating a video cover in the case of irrelevant action will be described.

In this embodiment, extracting at least two key frames in the video comprises: clustering images in the video to obtain at least two categories; extracting corresponding key frames from each category based on image quality evaluation algorithms; wherein action relevance of at least two key frames is being irrelevant. On this basis, different key frames that are action or behavior irrelevant can be used to display video content with large differences on the cover.

In this embodiment, based on the action relevance of at least two key frames, the feature information in at least two key frames is fused in a single image to generate a cover of the video, comprising: selecting a key frame as the main frame when the action relevance is being irrelevant; identifying feature information in each key frame based on the target recognition algorithm, and the feature information comprise a foreground target; fusing foreground targets in each key frame other than the main frame in the main frame to obtain a single image and using the single image as the cover of the video. On this basis, foreground targets in different key frames can be fused into the same key frame without considering the differences in backgrounds of different key frames, and the way of generating covers is more flexible.

As shown in FIG. 5, the video cover generation method in the third embodiment of the present disclosure includes:

S310, clustering the images in the video to obtain at least two categories.

In the present embodiment, according to the inter-frame similarity of the multi-frame image in the video, for example, whether the same tone, scene content, or examples contained clustering, etc., to provide a basis for extracting key frames, wherein the clustering algorithm, for example, K-means algorithm.

S320, based on the image quality evaluation algorithm, extracting a corresponding key frame from each category.

In this embodiment, for each category, the quality of each image can be referred to when selecting key frames. For example, using the Hyper Image Quality Assessment (HyperIQA) algorithm, the quality of the images in each category is evaluated, and then the corresponding key frames for each category are extracted according to the quality of the images in each category. Since the images in each category have similarity, one key frame can be extracted for each category. The extraction of key frames can be achieved through pre-trained convolution neural networks (Convolutional Neural Networks, CNN), which can automatically use the best quality image as the key frame for a category based on the image quality of the image in that category. By extracting the corresponding key frames according to categories, it can avoid extracting too many key frames for the same category and increasing unnecessary computational and storage space occupancy, and ensure that the content displayed in the cover is not similar or repeated, thereby maximizing the display of more video content in the cover.

S330, selecting a key frame as the main frame.

In the present embodiment, the main frame may be used to arrange other foreground target key frame. The main frame may be a key frame with the best image quality, or may be the first key frame, the last key frame, or a key frame located in the middle.

S340, recognizing feature information in each key frame based on the target recognition algorithm, the feature information comprising a foreground target.

In the present embodiment, based on the target recognition algorithm can recognize the foreground target and its location in each key frame, the target recognition algorithm may be a single CNN model (You Only Look Once, YOLO) algorithm, such as YOLOv5 algorithm, using a CNN network can predict the category and location of the target, and has good real-time performance.

It is also possible to recognize the foreground targets in each key frame first, then select the main frame, and based on the recognition results of the foreground targets, key frames with relatively prominent foreground targets and a relatively simple and non-cluttered background can also be selected as the main frame, which is convenient for subsequent integration with multiple foreground targets.

S350, fusing the foreground target in each key frame except the main frame into the main frame to obtain a single image, and using the single image as the cover of the video.

In this embodiment, the foreground targets in each key frame other than the main frame are arranged in the main frame to generate a cover. When arranging, the foreground targets can be scaled appropriately, and in the fusion process, the positional relationship between each foreground target and the original foreground target of the main frame can be considered to reduce the occlusion of the original foreground target, and multiple foreground targets can be centered or evenly distributed as much as possible.

FIG. 6 is a schematic diagram of fusing the foreground targets of multiple key frames in the main frame provided by the third embodiment of the present disclosure. As shown in FIG. 6, the cover includes two foreground targets, wherein the foreground target 1 can be the original foreground target of the main frame, and the scene of the main frame is that the foreground target 1 stands on the grass; the foreground target 2 can be extracted from other key frames, and the foreground target 2 is fused in the scene of the main frame. The two foreground targets, one left and one right, are centered on the cover as a whole.

The position of the original foreground target in the main frame can also be changed to make it reasonably arranged with the foreground targets in other key frames, making the arrangement of all foreground targets more flexible. In addition, the contour of each foreground target can also be processed by bolding, adding color, etc., to make the foreground target more prominent and more attractive to viewers.

S360, blurring the background of a single image, and the blur process comprises a fuzzy process or a feather process.

In this embodiment, in order to emphasize the foreground target, the background can be blurred to a certain extent, mainly including two kinds of blurring processes: a fuzzy processing and a feathering process. Among them, the fuzzy process can make all regions of the background have the same degree of blurring, and feathering can make the region closer to the foreground target have a lower degree of blurring, and the region farther away from the foreground target has a higher degree of blurring.

Fuzzy processing can be expressed as: $I_{blue}=\mathrm{Blur}(I\otimes(1-M),\sigma)+I\otimes M$; Feathering processing can be expressed as: $I_{feather}=\mathrm{Blur}(M,\sigma)\otimes I$.

Among them, $I_{blur}$ represents the cover after a fuzzy process, $I_{feather}$ represents the cover after a feathering process, Blur(,) represents the Gaussian blurring function, I represents the input image, and M represents the mask of the foreground target, $\sigma$ is the Gaussian distribution Standard Deviation, $\otimes$ represents the element-by-element matrix multiplication operation.

Video cover generation method in the present embodiment, the use of action or behavior-independent key frames, can display a large difference in the cover of the video content, enriched features displayed in the cover; by extracting the corresponding key frame according to the category, it is possible to ensure that the content displayed in the cover is not similar or repeated, so as to maximize the display of more video content in the cover; by identifying the foreground target in each key frame, and the foreground target in each key frame other than the main frame arranged in an appropriate position in the main frame, so that the use of a static single image, the feature information effectively fused multiple key frames; in addition, by processing the contour of the foreground target, and the background of the main frame blur processing, the foreground target can be made more prominent, so that viewers quickly understand the important content of the video.

Fourth Embodiment

FIG. 7 is a flowchart of a video cover generation method according to the fourth embodiment of the present disclosure. Based on the above embodiment, the process of generating a video cover in the case of irrelevant action will be described.

In the present embodiment, according to the action relevance of the at least two key frames, fusing the feature information of the at least two key frames in a single image to generate a cover of the video, comprising: in the case where the action relevance is being irrelevant, extracting an image block containing feature information in each key frame; stitching all image blocks to obtain a single image. On this basis, feature information in different key frames can be displayed in the cover.

As shown in FIG. 7, the fourth embodiment of the present disclosure video cover generation method, comprising:

S410, clustering the images in the video to obtain at least two categories.

S420, based on the image quality evaluation algorithm, extracting corresponding key frames from each category.

S430, extracting image blocks containing feature information in each key frame.

In the present embodiment, the image block in the key frame contains feature information, for example, the image block can reflect the hue of the key frame, the image block contains the expression or action features of the character in the key frame, the image block contains the foreground target recognized by the target recognition algorithm, or the image block contains real-time subtitles that match the key frame.

S440, stitching all image blocks to obtain a single image, and using the single image as the cover of the video.

All image blocks can be stitched together according to a preset template based on the feature information in each image block and the relative proportion of the content in the image block.

FIG. 8 is a schematic view of the present disclosure provides a plurality of four key frames of the image block stitching. As shown in FIG. 8, the cover is composed of four image blocks, four image blocks may be from different key frames. The present embodiment is not limited to the shape of each image block and the template stitching.

Video cover generation method in the present embodiment, in the case where the action relevance is being irrelevant, extracts the image blocks containing feature information in each key frame; all image blocks are spliced to obtain a single image. On this basis, the feature information in different key frames can be displayed in the cover, and the way of generating the cover is more flexible.

Fifth Embodiment

Figure 9:
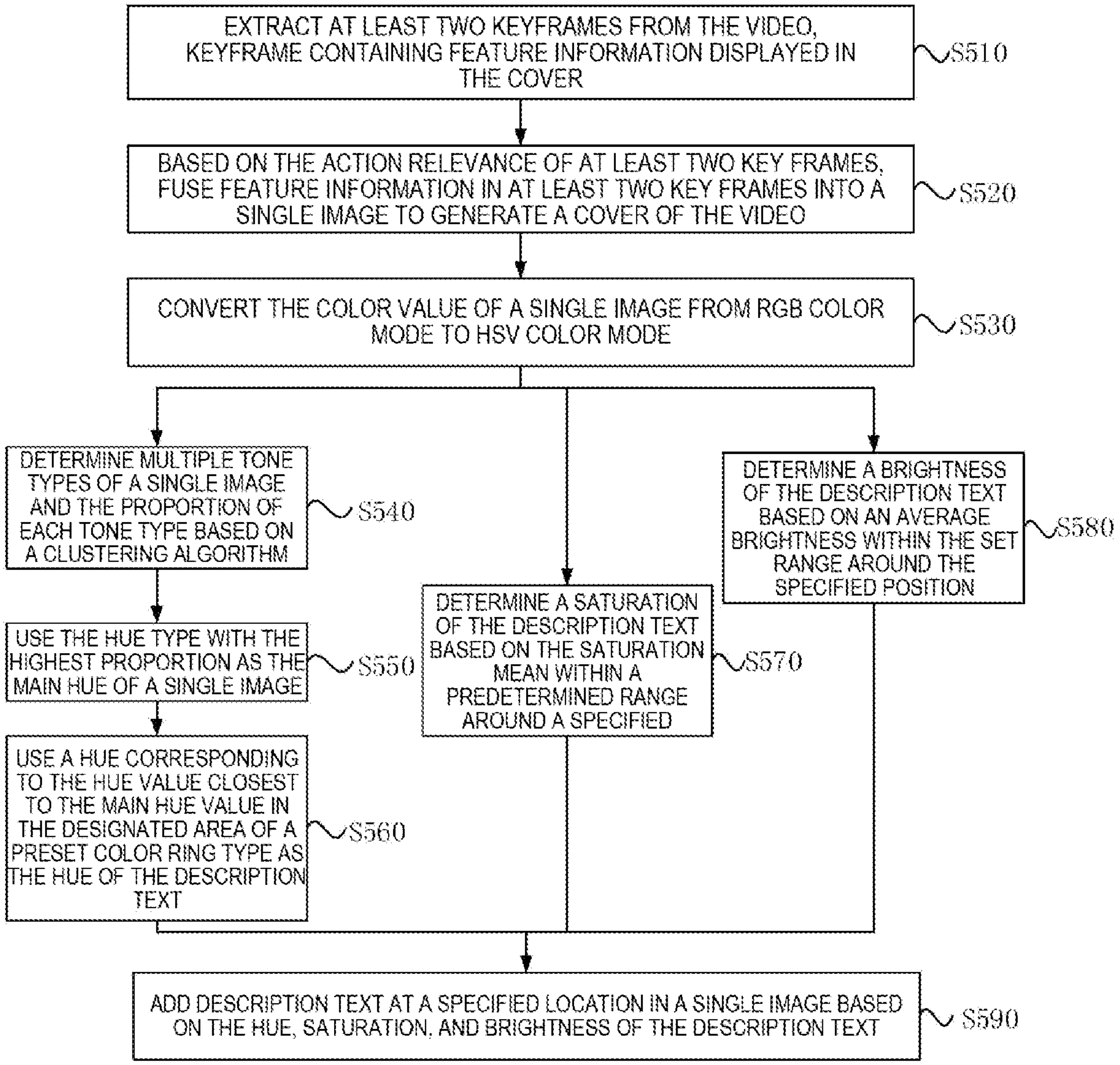
FIG. 9 is a flowchart of a video cover generation method according to the fifth embodiment of the present disclosure.

FIG. 9 is a flowchart of a video cover generation method according to the fifth embodiment of the present disclosure. Based on the above embodiment, the process of adding description text on a single image will be described.

In the present embodiment, after fusing the feature information of at least two key frames in a single image, further comprising: determining a hue, a saturation and a brightness of a description text according to the color value of a single image, wherein the color value by the red green blue (Red Green Blue, RGB) color mode is converted to hue saturation brightness (Hue Saturation Value, HSV) color mode; according to the hue, the saturation and the brightness of the description text, adding the description text at a specified position in a single image.

In the present embodiment, determining the color value of a single image according to the hue description text comprises: determining a plurality of hue types of a single image based on the clustering algorithm and a proportion of each hue type; using the hue type with a highest proportion as the main tone of the single image; using a hue corresponding to a hue value closest to a hue value of the main hue within a designated area of the preset color ring type as a hue of the description text.

In the present embodiment, determining the saturation and brightness of the text described in accordance with the color value of a single image comprises: determining a saturation of the description text based on an average saturation within a set range around the specified position; determining a brightness of the description text based on an average brightness within a set range around the specified position.

On this basis, the content of the cover can be enriched and beautified, so that viewers can understand the video content faster. The position, size, color scheme, and font of the description text can be determined according to the video style and overall color distribution, making the overall color scheme of the cover more reasonable and the visual effect better. The font of the description text can also be determined according to the theme of the video and the style of the cover, so that the description text can be better integrated with the video content and cover.

As shown in FIG. 9, the video cover generation method according to the fifth embodiment of the present disclosure comprises:

S510, extracting at least two key frames from the video, the key frame containing feature information to be displayed in the cover.

S520, based on the action relevance of at least two key frames, fusing feature information in at least two key frames into a single image to generate a cover of the video.

S530, converting the color value of a single image from RGB color mode to HSV color mode.

In the present embodiment, the color value is converted to HSV color mode, HSV color mode is a color model for the user's perception, focusing on color representation, can reflect the color, color depth and light and dark, determined according to the HSV color mode description text color scheme, so that the description of the text and the cover of the fusion is stronger, the viewer's visual effect is more comfortable.

The method for converting a color from the RGB color mode to the HSV color mode is as follows: denote the red, green, and blue coordinates of the color as (r, g, b), where r, g, and b are all real numbers between 0 and 1; let max be equivalent to the largest of r, g, and b, and min be equivalent to the smallest of r, g, and b. To find the (h, s, v) value of the color in the HSV space, where h∈[0, 360) is the hue angle of the angle, and s, v∈[0, 1] the saturation and brightness, there is the following conversion relationship:

$$h = \begin{cases} 0^\circ, & \max = \min \\ 60^\circ \times \frac{g-b}{\max - \min} + 0^\circ, & \max = r,\ g \geq b \\ 60^\circ \times \frac{g-b}{\max - \min} + 360^\circ, & \max = r,\ g < b \\ 60^\circ \times \frac{g-b}{\max - \min} + 120^\circ, & \max = \gamma \\ 60^\circ \times \frac{g-b}{\max - \min} + 240^\circ, & \max = b \end{cases}$$

-continued $$s = \begin{cases} 0^\circ, & \max = 0 \\ \frac{\max - \min}{\max} = 1 - \frac{\min}{\max}, & \max \neq 0 \end{cases}$$

$$v = \max$$

S540, determining multiple hue types of a single image and the proportion of each hue type based on the clustering algorithm.

Based on the clustering algorithm, the K-means algorithm can be used to analyze the overall color of a single image. For example, the overall color of a single image can be clustered into five categories, and the hue type and proportion of the main color of each category can be output.

S550, using the hue type with the highest proportion as the main hue of a single image.

S560, using a hue corresponding to a hue value closest to a hue value of the main hue within a designated area of the preset color ring type as a hue of the description text.

In the present embodiment, the method of determining the hue of the text is described, calculating a predefined color space of a plurality of colors closest to the main hue of a single image distance, and located in the specified H color ring type interval color, the color as the hue of the description text.

Figure 10:
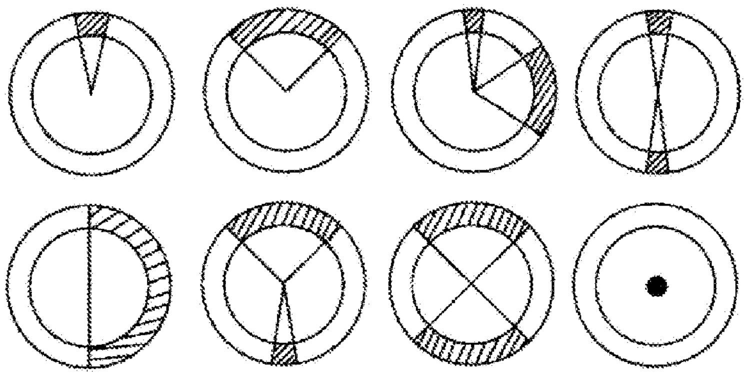
FIG. 10 is a schematic diagram of a preset color ring type provided in the fifth embodiment of the present disclosure.

FIG. 10 is a schematic diagram of a preset color ring type provided in the fifth embodiment of the present disclosure. As shown in FIG. 10, among the eight H color ring types, one can select the hue located in the black area (for example, the difference between the main hue is within 10°) and the hue value closest to the main hue value as the hue of the description text.

S570, determining the saturation of the description text based on the average saturation within the set range around the specified position.

In this embodiment, the saturation of the description text is determined according to the average saturation within the set range around the specified position in a single image, so that the saturation of the description text is as uniform as possible with the surrounding saturation, and the fusion is stronger. The saturation mean within the set range around the specified position is referred to as $\overline{S}$, a specified position is set as the coordinate origin, and the saturation of the description text (referred to as S) can be taken as the saturation corresponding to the golden ratio between the origin and, that is $S=(1-0.618)*\overline{S}$.

S580, determining the brightness of the description text based on the average brightness within the set range around the specified position.

In this embodiment, the brightness of the description text is determined according to the brightness mean within the set range around the specified position in a single image, so that the brightness of the description text is as uniform as possible with the saturation around it, and the fusion is stronger. The brightness mean within the set range around the specified position is referred to as $\overline{V}$, and the specified position is referred to as the coordinate origin. The brightness of the description text (referred to as V) can be taken as the brightness corresponding to the golden ratio between the origin and, that is $V=(1-0.618)*\overline{V}$.

S590, adding description text at a specified location in a single image based on the hue, saturation, and brightness of the description text.

Figure 11:
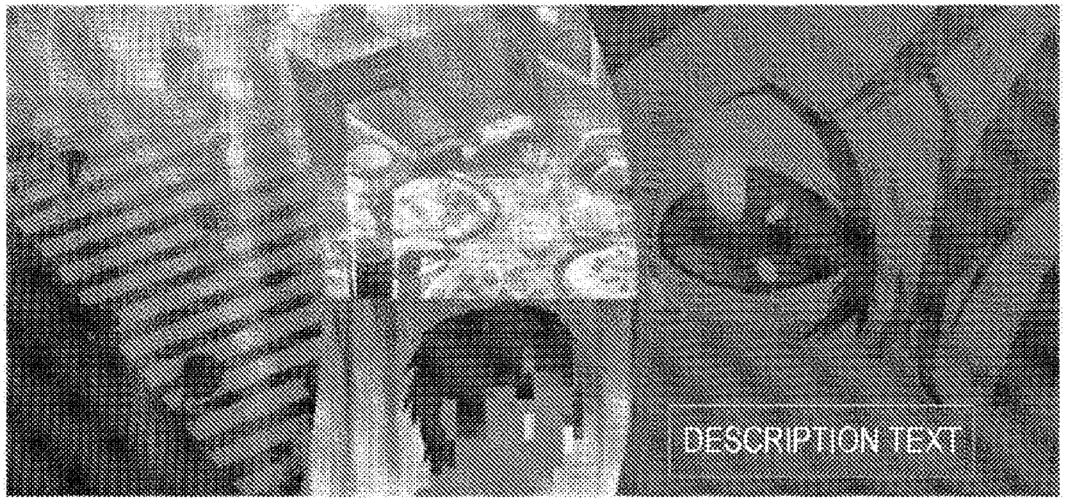
FIG. 11 is a schematic diagram of adding description text in a single image provided in the fifth embodiment of the present disclosure.

FIG. 11 is a schematic diagram of adding description text in a single image provided in the fifth embodiment of the present disclosure. As shown in FIG. 11, the description text is added at a position in the lower right corner of a single image, and a text box can be provided, and the font and color can be determined according to the overall style of a single image. The present embodiment is not limited to adding a specified position of the description text, for example, it can also be a position in the middle, upper left corner or upper right corner.

The method of the present embodiment may be added to a single image description text feature information of a plurality of fused key frames, this process takes into account the overall color distribution of the cover, the main hue of the description text similar to the image, the saturation and brightness of the image is also adapted to its surrounding fusion. In addition, the contrast may also be considered to describe the color of the text and a single image, thereby strengthening or weakening the description text.

Figure 12:
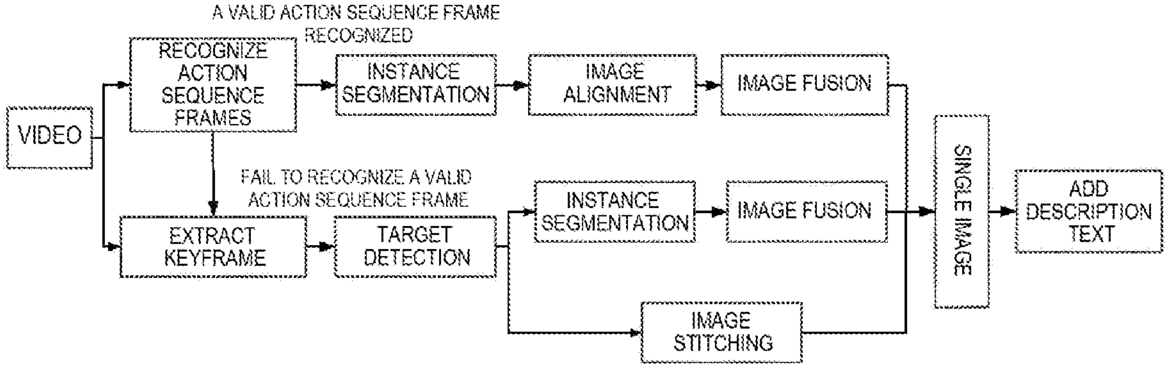
FIG. 12 is a schematic diagram of a video cover generation process provided in the fifth embodiment of the present disclosure.

FIG. 12 is a schematic diagram of a video cover generation process provided in the fifth embodiment of the present disclosure. As shown in FIG. 12, in this embodiment, the video cover generation mainly includes three ways:

First way: recognizing the action sequence frames in the video, and when the action relevance of multiple key frames is being relevant, performing instance segmentation and image fusion based on the action sequence frames, and fusing the instances in multiple action sequence frames into a generated cover background.

Second way: when the action relevance of multiple key frames is being irrelevant, performing clustering and key frame extraction on the images in the video, and extracting foreground targets from multiple key frames are extracted and fusing them in one of the main frames.

Third way: when the action relevance of multiple key frames is being irrelevant, performing clustering and key frame extraction on the images in the video, and stitching image blocks in multiple key frames to obtain a single image.

Through the above method, feature information from multiple key frames can be reflected in a static single image, improving the diversity of covers.

In addition, for a single image obtained by any of the above methods, the tone, saturation, and brightness of the description text can also be determined, and the description text can be added to the designated position in the single image based on this. The content of the description text can be representative subtitles or titles generated for the video.

For videos, cover generation can be prioritized or defaulted, that is, when a valid action sequence frame is identified, instance segmentation and image fusion are performed based on the action sequence frame, and instances from multiple action sequence frames are fused into a unified cover background. If there are no effectively identified action sequence frames, method two or method three is used, that is, the clustering algorithm is used to extract key frames, and then the foreground targets or image blocks in the key frames are extracted, and then the cover is generated by foreground target segmentation and fusion or image block splicing.

The above three methods can also be combined. For example, in method one, instances of multiple action sequence frames can also be arranged in an action sequence frame (which can be used as the main frame); for example, in method two, foreground targets in multiple key frames can also be arranged in a generated cover background.

The video cover generation method in the present embodiment, by adding description text, and the hue, saturation, and brightness of the description text can be determined according to the overall color value of a single image, which can enrich and beautify the content of the cover, so that the viewer can understand the video content faster, and make the overall scheme color of the cover more reasonable and better visual effect; in addition, the use of HSV color mode to determine the color scheme of the description text can reflect the color, the depth of the color, and the brightness, so that the description text and the cover The fusion is stronger; the video cover generation method of the present embodiment provides a variety of ways to generate the cover, and improves the flexibility of generating the cover.

Sixth Embodiment

Figure 13:
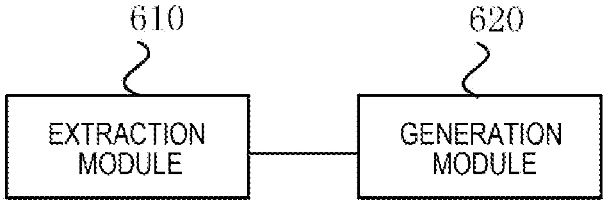
FIG. 13 is a schematic diagram of a video cover generating apparatus according to the sixth embodiment of the present disclosure.

FIG. 13 is a schematic diagram of the structure of a video cover generating apparatus provided in the sixth embodiment of the present disclosure. Please refer to the above embodiment for details not yet. As shown in FIG. 13, the apparatus comprises:

An extraction module 610, configured to extract at least two key frames in the video, wherein the key frames include feature information of the video; a generation module 620 configured to fuse the feature information in the at least two key frames into a single image based on the action relevance of the at least two key frames to generate a cover of the video, wherein the action relevance includes being relevant or being irrelevant.

Video cover generating apparatus of the present embodiment, by fusing feature information of a plurality of key frames in a single image, a single static image can show a rich video content, less resource occupation, high efficiency, and when the feature information fusion, considering the correlation of a plurality of key frames action, generating a video cover more flexible and diverse ways.

Based on the above, the extraction module 610 is configured to: based on an action recognition algorithm, recognize at least two action sequence frames in the video, and use each action sequence frame as the key frame; wherein, the action relevance is being relevant.

Based on the above, the generation module 620 comprises:

A segmentation unit configured to in a case that the action relevance is being relevant, perform instance segmentation on each action sequence frame to obtain feature information of the each action sequence frame, wherein the feature information comprises an instance and a background; a background generation unit configured to generate a cover background based on backgrounds of at least two action sequence frames; a first fusion unit configured to fuse instances of at least two action sequence frames into the cover background to obtain the single image, and using the single image as the cover of the video.

Based on the above, the background generation unit comprises:

A filling sub-unit is configured to for each action sequence frame, remove a corresponding instance from each action sequence frame, and filling a region corresponding to the removed instance in each action sequence frame according to characteristic information of the corresponding area of a given action sequence frame, obtaining a filling result corresponding to each action sequence frame, wherein the given action sequence frame comprises an action sequence frame of the at least two action sequence frames different from a current action sequence frame; a generating sub-unit is configured to generate the cover background based on the filling results of at least two action sequence frames.

Based on the above, the apparatus also comprises:

A reference frame selection module is configured to select an action sequence frame as a reference frame, and determining an affine transformation matrix between each action sequence frame and the reference frame according to a feature point matching algorithm; the alignment module is configured to align a background of each action sequence frame with a background of the reference frame according to the affine transformation matrix.

Based on the above, the fusion degree between the instances of at least two action sequence frames and the cover background decreases in chronological order.

Based on the above, the extraction module 610 comprises:

A clustering unit configured to cluster images in the video to obtain at least two categories; an extraction unit configured to extract key frame corresponding to each category based on an image quality evaluation algorithm; wherein the action relevance of the at least two key frames is being irrelevant.

Based on the above, the generation module 620 comprises:

A main frame selection unit configured to select a key frame as the main frame when the action relevance is being irrelevant; a recognition unit configured to recognize feature information in each key frame based on a target recognition algorithm, wherein the feature information comprise a foreground target; a second fusion unit configured to fuse the foreground target in each of the at least two key frames except the main frame into the main frame to obtain the single image, and using the single image as the cover of the video.

Based on the above, the apparatus also comprises:

A blur module configured to perform a blur process on the background of the single image, wherein the blur process includes a fuzzy process or a feather process.

Based on the above, the generation module 620 includes:

An image block extraction unit configured to in a case where the action relevance is being irrelevant, extract an image block containing the feature information in each key frame; a stitching unit configured to stitch all image blocks to obtain the single image.

Based on the above, the apparatus also comprises:

A text color determination module configured to determine a hue, a saturation, and a brightness of a description text based on a color value of the single image, wherein the color value is converted from the red, green, and blue RGB color mode to the hue saturation and brightness HSV color mode; a text addition module configured to add a description text at a specified position in the single image according to the hue, saturation, and brightness of the description text.

Based on the above, the text addition module comprises:

A proportion calculation unit configured to determine multiple hue types of the single image and a proportion of each hue type based on a clustering algorithm; a main hue determination unit configured to use a hue type with a highest proportion as a main hue of the single image; a hue determination unit configured to use a hue corresponding to a hue value closest to a hue value of the main hue within a designated area of the preset color ring type as a hue of the description text.

Based on the above, the text addition module comprises:

A saturation determination unit configured to determine a saturation of the description text based on an average saturation within a set range around the specified position; a brightness determination unit configured to determine a brightness of the description text based on an average brightness within a set range around the specified position.

Above-described video cover generating means may perform any embodiment of the present disclosure provides a video cover generating method, the execution method includes a corresponding functional modules and effects.

Seventh Embodiment

Figure 14:
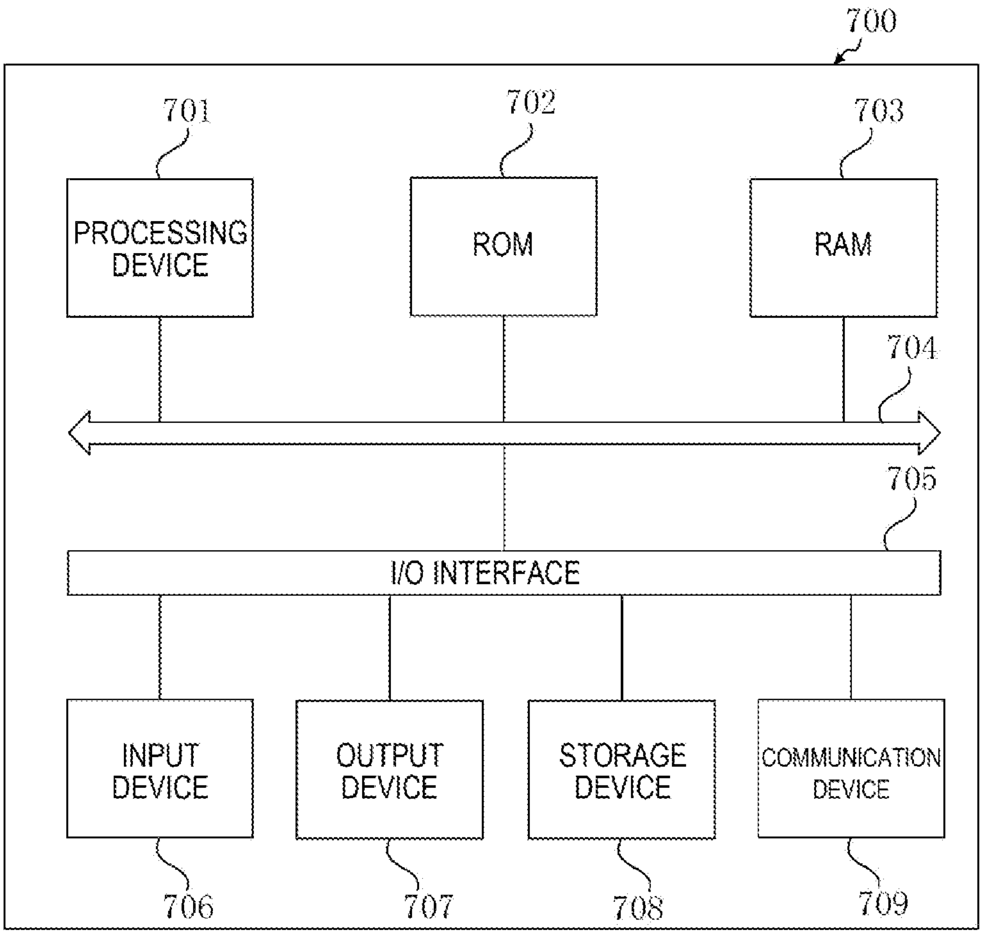
FIG. 14 is a schematic diagram of a hardware configuration of an electronic device according to a seventh embodiment of the present disclosure.

FIG. 14 is a schematic diagram of a hardware configuration of an electronic device according to the seventh embodiment of the present disclosure. FIG. 14 shows a schematic diagram of the structure of an electronic device 700 suitable for implementing the present disclosure embodiment. The electronic device 700 in the present disclosure includes but is not limited to devices with image processing functions such as computers, laptops, servers, tablets, or smartphones. The electronic device 700 shown in FIG. 14 is only an example and should not bring any limitations on the functionality and scope of use of the present disclosure embodiment.

As shown in FIG. 14, the electronic device 700 may include one or more processing devices (such as a Central Processor, graphics processing unit, etc.) 701, which can perform various appropriate actions and processes based on programs stored in Read-Only Memory (ROM) 702 or loaded from storage device 708 into Random Access Memory (RAM) 703. One or more processing devices 701 implement the traffic data packet forwarding method provided in this disclosure. In RAM 703, various programs and data required for the operation of the electronic device 700 are also stored. Processing devices 701, ROM 702, and RAM 703 are connected to each other through bus 705. Input/Output (I/O) interface 704 is also connected to bus 705.

Typically, the following devices can be connected to the I/O interface 704: input devices 706 including touch screens, touchpads, keyboards, mice, cameras, microphones, accelerometers, gyroscopes, etc.; output devices 707 including liquid crystal displays (LCDs), speakers, vibrators, etc.; storage devices 708 including magnetic tapes, hard disks, etc., which are configured to store one or more programs; and communication devices 709. Communication devices 709 can allow electronic devices 700 to communicate wirelessly or wirelessly with other devices to exchange data. Although FIG. 14 shows an electronic device 700 with multiple devices, it is not required to implement or have all of the devices shown. More or fewer devices can be implemented or provided instead.

According to embodiments of the present disclosure, the process described above with reference to the flowchart may be implemented as a computer software program. For example, embodiments of the present disclosure include a computer program product comprising a computer program carried on a computer-readable medium, the computer program comprising program code for performing the method shown in the flowchart. In such embodiments, the computer program may be downloaded and installed from the network through the communication device 709, or installed from the storage device 708, or installed from the ROM 702. When the computer program is executed by the processing device 701, the above-described functions defined in the method of the present disclosure are performed.

The computer-readable storage medium described above can be a computer-readable signal medium or a computer-readable storage medium, or any combination thereof. The computer-readable storage medium is, for example, but not limited to, an electrical, magnetic, optical, electromagnetic, infrared, or semiconductor system, device, or device, or any combination thereof. Examples of computer-readable storage media may include but are not limited to: an electrical connection with one or more wires, a portable computer disk, a hard disk, RAM, ROM, an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium can be any tangible medium containing or storing a program that can be used by an instruction execution system, apparatus, or device or in combination therewith. In the present disclosure, a computer-readable signal medium may include a data signal propagated in a baseband or as part of a carrier wave, which carries computer-readable program code. Such propagated data signals can take many forms, including but not limited to electromagnetic signals, optical signals, or any suitable combination thereof. Computer-readable signal media can also be any computer-readable medium other than computer-readable storage media, which can send, propagate, or transmit programs for use by or in conjunction with instruction execution systems, devices, or devices. The program code contained on the computer-readable medium can be transmitted using any suitable medium, including but not limited to: wires, optical cables, radio frequency (RF), etc., or any suitable combination thereof.

In some implementation methods, clients and servers can communicate using any currently known or future developed network protocol such as HyperText Transfer Protocol (HTTP), and can interconnect with any form or medium of digital data communication (such as communication networks). Examples of communication networks include local area networks (LANs), wide area networks (WANs), the Internet (such as the Internet), and end-to-end networks (such as ad hoc end-to-end networks), as well as any currently known or future developed networks.

The computer-readable medium can be included in the electronic device, or it can exist alone without being assembled into the electronic device.

The computer-readable medium carries one or more programs, and when the one or more programs are executed by the electronic device, the electronic device: extracts at least two key frames in the video, wherein the key frames include feature information displayed in the cover; according to the action relevance of the at least two key frames, the feature information in the at least two key frames is fused in a single image to generate the cover of the video, wherein the action relevance includes correlation or being irrelevant.

It may be one or more programming languages or combinations thereof to write computer program code for performing the operations of the present disclosure, the above-described programming languages include but are not limited to Object Oriented programming languages—such as Java, Smalltalk, C++, further including conventional procedural programming languages—such as “C” language or similar programming languages. The program code may be executed entirely on the user’s computer, partially executed on the user’s computer, executed as a standalone software package, partially executed on the user’s computer on a remote computer, or entirely on a remote computer or server. In the case of a remote computer, the remote computer may be any kind of network—including LAN or WAN—connected to the user’s computer, or may be connected to an external computer (e.g., using an Internet service provider to connect via the Internet).

The flowcharts and block diagrams in the accompanying drawings illustrate the architecture, functions, and operations of systems, methods, and computer program products that may be implemented in accordance with various embodiments of the present disclosure. in this regard, each block in the flowchart or block diagram may represent a module, program segment, or portion of code that contains one or more executable instructions for implementing a specified logical function. It should also be noted that in some alternative implementations, the functions indicated in the blocks may also occur in a different order than those indicated in the figures. For example, two blocks represented in succession may actually be executed substantially in parallel, and they may sometimes be executed in reverse order, depending on the function involved. It should also be noted that each block in the block diagram and/or flowchart, and combinations of blocks in the block diagram and/or flowchart, may be implemented using a dedicated hardware-based system that performs the specified function or operation, or may be implemented using a combination of dedicated hardware and computer instructions.

Described in the present embodiment relates to the disclosed unit may be implemented by way of software, may be implemented by way of hardware. Wherein the name of the unit in one case does not constitute a limitation on the unit itself.

The functions described above in this article can be performed at least in part by one or more hardware logic components. For example, without limitation, exemplary types of hardware logic components that can be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, machine-readable media can be tangible media that can contain or store programs for use by or in conjunction with instruction execution systems, devices, or devices. Machine-readable media can be machine-readable signal media or machine-readable storage media. Machine-readable media can include, but are not limited to, electronic, magnetic, optical, electromagnetic, infrared, or semiconductor systems, devices, or devices, or any suitable combination thereof. Examples of machine-readable storage media may include electrical connections based on one or more wires, portable computer disks, hard disks, RAM, ROM, EPROM or flash memory, optical fibers, CD-ROMs, optical storage devices, magnetic storage devices, or any suitable combination thereof.

According to one or more embodiments of the present disclosure, Example 1 provides a video cover generation method, comprising:

extracting at least two key frames in the video, wherein the key frame comprises feature information to be displayed in a cover;

according to an action relevance of the at least two key frames, fusing the feature information in the at least two key frames in a single image to generate a cover of the video, wherein the action relevance comprises being relevant or being irrelevant.

Example 2. the method of example 1, wherein extracting at least two key frames in a video comprises:

Based on an action recognition algorithm, recognizing at least two action sequence frames in the video, and using each action sequence frame as the key frame;

Wherein, the action relevance is being relevant.

Example 3. the method of example 2, wherein according to an action relevance of the at least two key frames, merging the feature information in the at least two key frames in a single image to generate a cover of the video comprises:

In a case that the action relevance is being relevant, performing instance segmentation on each action sequence frame to obtain feature information of each action sequence frame, wherein the feature information comprises an instance and a background;

Generating a cover background based on backgrounds of at least two action sequence frames;

Fusing instances of at least two action sequence frames into the cover background to obtain the single image, and using the single image as the cover of the video.

Example 4. the method of example 3, wherein generating a cover background based on backgrounds of at least two action sequence frames comprises:

For each action sequence frame, removing a corresponding instance from each action sequence frame, and filling a region corresponding to the removed instance in each action sequence frame according to characteristic information of the corresponding area of a given action sequence frame, obtaining a filling result corresponding to each action sequence frame, wherein the given action sequence frame comprises an action sequence frame of the at least two action sequence frames different from a current action sequence frame;

Generating the cover background based on the filling results of at least two action sequence frames.

Example 5. the method of example 3, prior to generating a cover background based on backgrounds of at least two action sequence frames, further comprising:

Selecting an action sequence frame as a reference frame, and determining an affine transformation matrix between each action sequence frame and the reference frame according to a feature point matching algorithm;

Aligning a background of each action sequence frame with a background of the reference frame according to the affine transformation matrix.

Example 6. the method of example 3, wherein a degree of fusion of instances of the at least two action sequence frames with the cover background decreases sequentially in a chronological order.

7. the method of example 1, wherein extracting at least two key frames in a video comprises:

Clustering the images in the video to obtain at least two categories;

Extracting a key frame corresponding to each category based on an image quality evaluation algorithms;

Wherein, an action relevance of the at least two key frames is being irrelevant.

Example 8. the method of example 7, wherein the feature information in the at least two key frames is fused in a single image to generate a cover of the video based on an action relevance of the at least two key frames, comprising:

In a case where the action relevance is being irrelevant, selecting a key frame as the main frame;

Recognizing feature information in each key frame based on a target recognition algorithm, wherein the feature information comprise a foreground target;

Fusing the foreground target in each of the at least two key frames except the main frame into the main frame to obtain the single image, and using the single image as the cover of the video.

Example 9. the method of example 8, after obtaining the single image, further comprising:

Performing a blur process on the background of the single image, wherein the blur process includes a fuzzy process or a feather process.

Example 10. the method of example 7, wherein according to an action relevance of the at least two key frames, fusing the feature information in the at least two key frames in a single image to generate a cover of the video comprises:

In a case where the action relevance is being irrelevant, extracting an image block containing the feature information in each key frame;

Stitching all image blocks to obtain the single image.

Example 11. the method of any one of examples 1-10, after fusing the feature information in the at least two key frames in a single image, further comprising:

Determining a hue, a saturation, and a brightness of a description text based on a color value of the single image, wherein the color value is converted from the red, green, and blue RGB color mode to the hue saturation and brightness HSV color mode;

Adding a description text at a specified position in the single image according to the hue, saturation, and brightness of the description text.

Example 12. the method of example 11, wherein determining a hue of description text based on a color value of the single image comprises:

Determining multiple hue types of the single image and a proportion of each hue type based on a clustering algorithm;

Using a hue type with a highest proportion as a main hue of the single image;

Using a hue corresponding to a hue value closest to a hue value of the main hue within a designated area of the preset color ring type as a hue of the description text.

Example 13. the method of example 11, wherein determining a saturation and a lightness of a description text based on a color value of the single image comprises:

Determining a saturation of the description text based on an average saturation within a set range around the specified position;

Determining a brightness of the description text based on an average brightness within a set range around the specified position.

Example 14 provides a video cover generation device, comprising:

An extraction module, configured to extract at least two key frames in the video, wherein the key frame comprises feature information of the video;

A generation module, configured to according to an action relevance of the at least two key frames, fuse the feature information in the at least two key frames in a single image to generate a cover of the video, wherein the action relevance comprises being relevant or being irrelevant.

Example 15 provides an electronic device comprising:

One or more processors;

A storage device configured to store one or more programs;

When the one or more programs are executed by the one or more processors, the one or more processors implement the video cover generation method as described in any one of examples 1-13.

Example 16 provides a computer-readable medium having a computer program stored thereon that, when executed by a processor, implements a video cover generation method as described in any one of examples 1-13.

In addition, although multiple operations are depicted in a specific order, this should not be understood as requiring these operations to be performed in the specific order shown or in sequential order. Under certain circumstances, multitasking and parallel processing may be advantageous. Similarly, although multiple implementation details are included in the above discussion, these should not be construed as limiting the scope of the present disclosure. Some features described in the context of individual embodiments can also be implemented in combination in a single embodiment. Conversely, multiple features described in the context of a single embodiment can also be implemented in multiple embodiments separately or in any suitable sub-combination.

We claim:

1. A video cover generation method, comprising:

extracting at least two key frames in a video, wherein the key frame comprises feature information to be displayed in a cover, and wherein extracting the at least two key frames comprises recognizing at least two action sequence frames in the video, and utilizing the at least two action sequence frames as the at least two key frames; and according to an action relevance of the at least two key frames, fusing the feature information in the at least two key frames in a single image to generate a cover of the video, wherein the action relevance comprises being relevant or being irrelevant, and wherein fusing the feature information in the at least two key frames to generate the cover of the video comprises:

performing instance segmentation on each of the at least two action sequence frames to obtain feature information of each of the at least two action sequence frames, wherein the feature information comprises an instance and a background, selecting an action sequence frame as a reference frame, and determining an affine transformation matrix between each of the at least two action sequence frames and the reference frame according to a feature point matching algorithm, aligning the background of each of the at least two action sequence frames with a background of the reference frame according to the affine transformation matrix, generating a cover background based on backgrounds of the at least two action sequence frames, and fusing instances of the at least two action sequence frames into the cover background to obtain the single image, and utilizing the single image as the cover of the video.

2. The method of claim 1, wherein generating the cover background based on the backgrounds of the at least two action sequence frames comprises:

for each of the at least two action sequence frames, removing a corresponding instance from each of the at least two action sequence frames, and filling a region corresponding to the removed instance in each of the at least two action sequence frames, obtaining a filling result corresponding to each of the at least two action sequence frames; and generating the cover background based on the filling results of the at least two action sequence frames.

3. The method of claim 1, wherein a degree of fusion of instances of the at least two action sequence frames with the cover background decreases sequentially in a chronological order.

4. The method of claim 1, wherein extracting at least two key frames in a video comprises:

clustering images in the video to obtain at least two categories;

extracting a key frame corresponding to each category based on an image quality evaluation algorithms;

wherein, an action relevance of the at least two key frames is being irrelevant.

5. The method of claim 4, wherein according to an action relevance of the at least two key frames, fusing the feature information in the at least two key frames in a single image to generate a cover of the video comprises:

in a case where the action relevance is being irrelevant, selecting a key frame as a main frame;

recognizing feature information in each key frame based on a target recognition algorithm, wherein the feature information comprise a foreground target;

fusing the foreground target in each of the at least two key frames except the main frame into the main frame to obtain the single image, and using the single image as the cover of the video.

6. The method of claim 5, after obtaining the single image, further comprising:

performing a blur process on the background of the single image, wherein the blur process includes a fuzzy process or a feather process.

7. The method of claim 4, wherein according to an action relevance of the at least two key frames, fusing the feature information in the at least two key frames in a single image to generate a cover of the video comprises:

in a case where the action relevance is being irrelevant, extracting an image block containing the feature information in each key frame;

stitching all image blocks to obtain the single image.

8. The method of claim 1, after fusing the feature information in the at least two key frames in the single image, further comprising:

determining a hue, a saturation, and a brightness for a description text based on a color value of the single image, wherein the color value is converted from the red, green, and blue RGB color mode to the hue saturation and brightness HSV color mode; and adding the description text at a specified position in the single image according to the determined hue, saturation, and brightness.

9. The method of claim 8, wherein determining a hue of description text based on a color value of the single image comprises:

determining multiple hue types of the single image and a proportion of each hue type based on a clustering algorithm;

using a hue type with a highest proportion as a main hue of the single image;

using a hue corresponding to a hue value closest to a hue value of the main hue within a designated area of a preset color ring type as a hue of the description text.

10. The method of claim 8, wherein determining a saturation and a lightness of a description text based on a color value of the single image comprises:

determining a saturation of the description text based on an average saturation within a set range around the specified position;

determining a brightness of the description text based on an average brightness within a set range around the specified position.

11. An electronic device comprising: at least one processor; a storage device configured to store at least one program; when the at least one program is executed by the at least one processor, the at least one processor implements operations comprising:

extracting at least two key frames in a video, wherein the key frame comprises feature information to be displayed in a cover, and wherein extracting the at least two key frames comprises recognizing at least two action sequence frames in the video, and utilizing the at least two action sequence frames as the at least two key frames; and according to an action relevance of the at least two key frames, fusing the feature information in the at least two key frames in a single image to generate a cover of the video, wherein the action relevance comprises being relevant or being irrelevant, and wherein fusing the feature information in the at least two key frames to generate the cover of the video comprises:

performing instance segmentation on each of the at least two action sequence frames to obtain feature information of each of the at least two action sequence frames, wherein the feature information comprises an instance and a background, selecting an action sequence frame as a reference frame, and determining an affine transformation matrix between each of the at least two action sequence frames and the reference frame according to a feature point matching algorithm, aligning the background of each of the at least two action sequence frames with a background of the reference frame according to the affine transformation matrix, generating a cover background based on backgrounds of the at least two action sequence frames, and fusing instances of the at least two action sequence frames into the cover background to obtain the single image, and utilizing the single image as the cover of the video.

12. The electronic device of claim 11, wherein generating the cover background based on the backgrounds of the at least two action sequence frames comprises:

for each of the at least two action sequence frames, removing a corresponding instance from each of the at least two action sequence frames, and filling a region corresponding to the removed instance in each of the at least two action sequence frames, obtaining a filling result corresponding to each of the at least two action sequence frames; and generating the cover background based on the filling results of the at least two action sequence frames.

13. The electronic device of claim 11, wherein a degree of fusion of instances of the at least two action sequence frames with the cover background decreases sequentially in a chronological order.

14. The electronic device of claim 11, wherein extracting the at least two key frames in the video comprises:

clustering the images in the video to obtain at least two categories; and extracting a key frame corresponding to each category based on an image quality evaluation algorithms, wherein an action relevance of the at least two key frames is being irrelevant.

15. The electronic device of claim 11, the operations further comprising:

determining a hue, a saturation, and a brightness of a description text based on a color value of the single image, wherein the color value is converted from the red, green, and blue RGB color mode to the hue saturation and brightness HSV color mode; and adding the description text at a specified position in the single image according to the hue, saturation, and brightness of the description text.

16. A non-transitory computer readable storage medium, storing a computer program, wherein the computer program, when executed by a processor, causes the processor to implement operations comprising:

extracting at least two key frames in a video, wherein the key frame comprises feature information to be displayed in a cover, and wherein extracting the at least two key frames comprises recognizing at least two action sequence frames in the video, and utilizing the at least two action sequence frames as the at least two key frames; and according to an action relevance of the at least two key frames, fusing the feature information in the at least two key frames in a single image to generate a cover of the video, wherein the action relevance comprises being relevant or being irrelevant, and wherein fusing the feature information in the at least two key frames to generate the cover of the video comprises:

performing instance segmentation on each of the at least two action sequence frames to obtain feature information of each of the at least two action sequence frames, wherein the feature information comprises an instance and a background, selecting an action sequence frame as a reference frame, and determining an affine transformation matrix between each of the at least two action sequence frames and the reference frame according to a feature point matching algorithm, aligning the background of each of the at least two action sequence frames with a background of the reference frame according to the affine transformation matrix, generating a cover background based on backgrounds of the at least two action sequence frames, and fusing instances of the at least two action sequence frames into the cover background to obtain the single image, and utilizing the single image as the cover of the video.

17. The non-transitory computer readable storage medium of claim 16, wherein generating the cover background based on the backgrounds of the at least two action sequence frames comprises:

for each of the at least two action sequence frames, removing a corresponding instance from each of the at least two action sequence frames, and filling a region corresponding to the removed instance in each of the at least two action sequence frames, obtaining a filling result corresponding to each of the at least two action sequence frames; and generating the cover background based on the filling results of the at least two action sequence frames.

18. The non-transitory computer readable storage medium of claim 16, wherein a degree of fusion of instances of the at least two action sequence frames with the cover background decreases sequentially in a chronological order.

19. The non-transitory computer readable storage medium of claim 16, wherein extracting the at least two key frames in the video comprises:

clustering the images in the video to obtain at least two categories; and extracting a key frame corresponding to each category based on an image quality evaluation algorithms, wherein an action relevance of the at least two key frames is being irrelevant.

20. The non-transitory computer readable storage medium of claim 16, the operations further comprising:

determining a hue, a saturation, and a brightness of a description text based on a color value of the single image, wherein the color value is converted from the red, green, and blue RGB color mode to the hue saturation and brightness HSV color mode; and adding the description text at a specified position in the single image according to the hue, saturation, and brightness of the description text.

* * * * *